(12) United States Patent
Richter et al.

(10) Patent No.: US 11,716,042 B2
(45) Date of Patent: Aug. 1, 2023

(54) METHOD, SYSTEM AND APPARATUS FOR DISCHARGING DC LINK CAPACITORS IN POWER-DISTRIBUTION-UNITS

(71) Applicant: Panasonic Intellectual Property Management Co., Ltd., Osaka (JP)

(72) Inventors: Max Richter, Schleswig-holstein (DE); Eike Meints, Hamburg (DE)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/640,166

(22) PCT Filed: Oct. 27, 2020

(86) PCT No.: PCT/JP2020/040185
§ 371 (c)(1),
(2) Date: Mar. 3, 2022

(87) PCT Pub. No.: WO2021/124685
PCT Pub. Date: Jun. 24, 2021

(65) Prior Publication Data
US 2022/0352813 A1 Nov. 3, 2022

(30) Foreign Application Priority Data
Dec. 20, 2019 (EP) .................................... 19218723

(51) Int. Cl.
*H02M 3/07* (2006.01)
*H02P 27/06* (2006.01)
(52) U.S. Cl.
CPC .................................... *H02P 27/06* (2013.01)
(58) Field of Classification Search
CPC ......... H02P 27/06; H02M 1/322; H02M 1/08; H02M 7/48
See application file for complete search history.

(56) References Cited

U.S. PATENT DOCUMENTS

2011/0031939 A1 2/2011 Funaba et al.
2012/0280728 A1 11/2012 Hussein et al.
(Continued)

FOREIGN PATENT DOCUMENTS

EP 2 460 682 A1 6/2012
EP 3 496 251 A1 6/2019
(Continued)

OTHER PUBLICATIONS

International Search Report issued in International Patent Application No. PCT/JP2020/040185, dated Jan. 20, 2021.

*Primary Examiner* — Muhammad S Islam
(74) *Attorney, Agent, or Firm* — McDermott Will & Emery LLP (57) ABSTRACT

The present subject matter refers a discharge circuit for a smoothing capacitor within a power-distribution-unit. The discharge circuit comprises a first sub-circuit connected in parallel to a DC-Link capacitor, said first sub-circuit in turn comprises a series connection of a first switching element (SE) and a first discharge resistor, wherein the DC-link capacitor is connected in parallel to a power supply. A second sub-circuit is connected in parallel to the DC-Link capacitor and comprises a series connection of a second switching element (SE) and a second discharge resistor. A control device is configured to control the plurality of SEs within the sub-circuits by scheduling switching of the plurality of SEs. Such scheduling comprises switching ON of the second SE after a switching ON of the first SE for enabling a discharging of the DC link capacitor within a predetermined duration.

13 Claims, 7 Drawing Sheets

(56) References Cited

U.S. PATENT DOCUMENTS

| | | | | |
|---|---|---|---|---|
| 2015/0049531 A1* | 2/2015 | Yamanaka | ......... | H03K 17/0828 |
| | | | | 363/131 |
| 2016/0268900 A1* | 9/2016 | Miyazaki | .............. | H02M 1/088 |
| 2016/0373103 A1* | 12/2016 | Miyamae | ................ | H03K 17/04 |
| 2017/0149330 A1* | 5/2017 | Osanai | .................... | H02M 3/07 |
| 2017/0207782 A1* | 7/2017 | Takizawa | ............ | H02M 7/5381 |
| 2018/0083610 A1* | 3/2018 | Ishii | ...................... | H02M 3/158 |

FOREIGN PATENT DOCUMENTS

| | | |
|---|---|---|
| JP | 2010-178540 A | 8/2010 |
| JP | 2012-120436 A | 6/2012 |
| JP | 2016-096618 A | 5/2016 |

\* cited by examiner

METHOD, SYSTEM AND APPARATUS FOR DISCHARGING DC LINK CAPACITORS IN POWER-DISTRIBUTION-UNITS

CROSS-REFERENCE OF RELATED APPLICATIONS

This application is the U.S. National Phase under 35 U.S.C. § 371 of International Patent Application No. PCT/JP2020/040185, filed on Oct. 27, 2020, which in turn claims the benefit of European Patent Application No. 19218723.5, filed on Dec. 20, 2019, the entire disclosures of which Applications are incorporated by reference herein.

TECHNICAL FIELD

The present subject matter relates to generally to power distribution-units and, more particularly to discharging mechanism therein.

BACKGROUND ART

A state of the art electric motor drive-device for driving an electric motor via an inverter has a smoothing-capacitor (i.e. a DC Link capacitor) provided in parallel with a DC power supply at the inverter input side, in an example, an electric motor driven vehicle such as a hybrid vehicle includes a drive motor, a high-voltage battery for supplying power to the drive motor, and an inverter. The smoothing capacitor or the DC link capacitor is provided between the input terminals of the inverter to smooth voltage-fluctuations and stabilize the operation of the inverter.

The smoothing capacitor serves to reduce the impedance of a main-circuit, suppresses surge voltage, serves to absorb regenerative-power in the case of abnormality, and prevents overvoltage in the main circuit. An example scenario of abnormality is a load dump. In this scenario, while the electric motor is performing regenerative operation, input wiring of the inverter is disconnected due to vibration or the like. In other example, a breaker provided on the input side fails during abnormal-scenario, and thus a connection between a smoothing capacitor on the inverter input side and a DC power supply is opened Another example scenario is when to rescue a driver in an event of car accident or vehicle maintenance, it is necessary to quickly discharge smoothing-capacitor or the DC link capacitor. Such scenarios also remain prone to voltage-surges and require overvoltage protection.

As a conventional-technique for suppressing such overvoltage, an overvoltage protection device is provided which includes: a bypass-resistance circuit interposed between terminals at an input part of an inverter; a relay interposed in series to the bypass resistance circuit and controlled, to be opened/closed, and a control-means for controlling the relay to make the bypass resistance-circuit active when input-voltage of the inverter is equal to or greater than reference-voltage.

Figure 1:
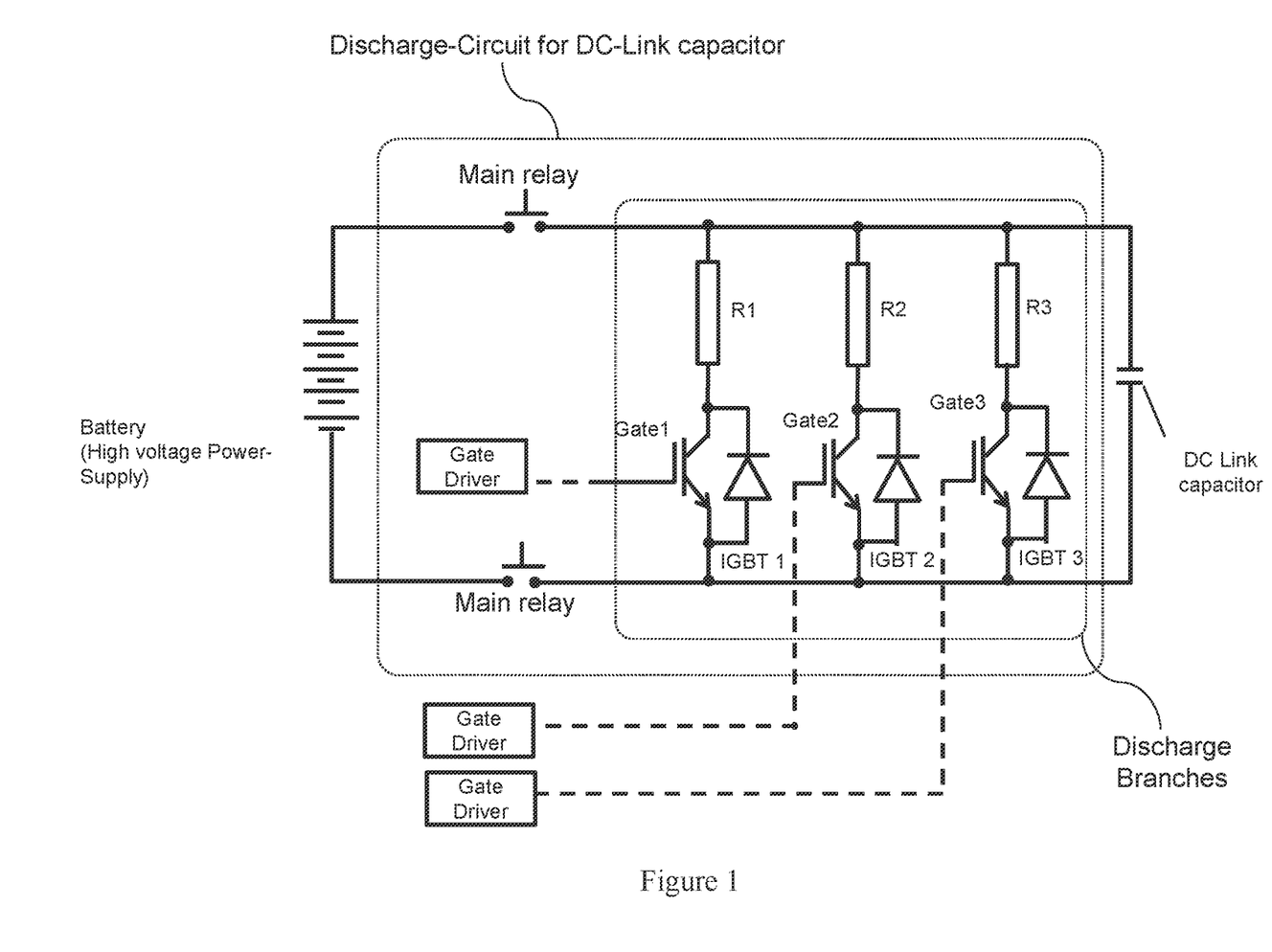
FIG. 1 illustrates an electronic circuit, in accordance with state of the art.

FIG. 1 illustrates a state of the art discharge-circuit with parallel-branches of semiconductors in series with resistor. For example, as discussed with respect to FIG. 1, the discharge-circuit is configured by connecting, in parallel, about three series circuits of discharge-resistors and IGBTs. Likewise, the concept of adjusting discharge-duration within the circuit to a certain target-duration also corresponds to the conventional mechanisms.

During the course of setting the time until completion of discharge within a certain range (the time until completion of discharge is specified by customers), the conventional circuits exhibit a complicated-configuration and a large-circuit area. For example, as may be seen from the FIG. 1, all branches (i.e. the three series circuits or three discharge branches) are controlled separately by different driver-circuits. In such a scenario, controlling the multiple discharge-circuits for setting the discharge duration to a target value is always a challenging task and requires frequent quality-checks and maintenance owing to complex arrangement.

Accordingly, there lies a need of setting the discharge-duration to a target value without incurring an additional overhead such as complicated electrical-circuit.

Specifically, there lies a need of setting the discharge-duration without requiring large electronic/electrical circuits, especially in case of presence of multiple branches for discharging the capacitor.

SUMMARY OF INVENTION

This summary is provided to introduce a selection of concepts in a simplified format that is further described in the detailed description of the present disclosure. This summary is neither intended to identify key inventive concepts of the disclosure nor is it intended for determining the scope of the invention or disclosure.

In an embodiment, the present subject matter refers a discharge circuit for a smoothing capacitor within a power-distribution-unit. The discharge circuit comprises a first sub-circuit connected in parallel to a DC-Link capacitor. The first sub-circuit in turn comprises a series connection of a first switching element (SE) and a first discharge resistor, wherein the DC-link capacitor is connected in parallel to a power supply. A second sub-circuit is connected in parallel to the DC-Link capacitor and comprises a series connection of a second switching element (SE) and a second discharge resistor. A control device is configured to control the plurality of SEs within the sub-circuits by scheduling switching of the plurality of SEs. Such scheduling comprises switching ON of the second SE after a switching ON of the first SE for enabling a discharging of the DC link capacitor within a predetermined duration.

In an implementation, the first discharge resistor of the first sub-circuit exhibits a resistance greater than second discharge-resistor of the second sub-circuit, and the first SE is a smaller-scale device than the second SE.

In a further embodiment, the present subject matter illustrates an electric motor drive comprising a DC-link capacitor connected in parallel to a DC power supply. An inverter converts DC power from the DC capacitor to multi-phase AC power, to drive an electric motor. An overvoltage-protection unit is provided within the electric motor drive, wherein such overvoltage protection unit may be defined by the discharge circuit in accordance with the present subject matter.

The objects and advantages of the embodiments will be realized and achieved at-least by the elements, features, and combinations particularly pointed out in the claims. It is to be understood that both the foregoing general description and the following detailed description are representative and explanatory and are not restrictive of the invention, as claimed.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DESCRIPTION OF EMBODIMENTS

For the purpose of promoting an understanding of the principles of the present disclosure, reference will now be made to the embodiment illustrated in the drawings and specific language will be used to describe the same. It will be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or subsystems or elements or structures or components proceeded by "comprises . . . a" does not, without more constraints, preclude the existence of other devices or other subsystems or other elements or other structures or other components or additional devices or additional subsystems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Figure 2:
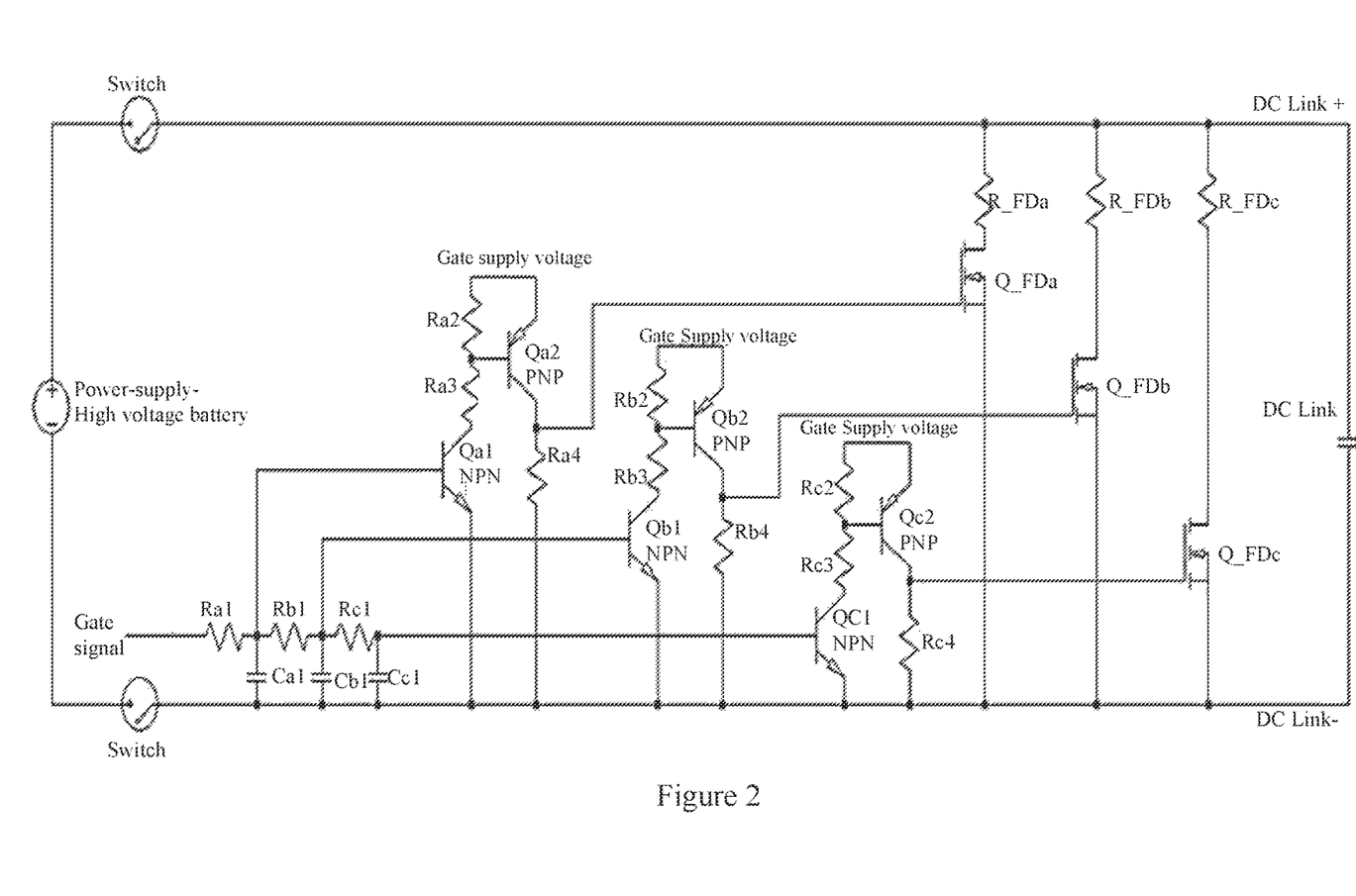
FIG. 2 illustrates a schematic-electronic system, in accordance with an embodiment of the present subject matter.

FIG. 2 illustrates an electronic system or a discharge circuit for a smoothing capacitor within a power-distribution unit. The discharge-circuit comprises a first sub-circuit connected in parallel to a DC-Link capacitor (i.e. DC-Link). The first sub-circuit in turn comprises a series-connection of a first switching element SE (Q_FDa) and a first discharge resistor (R_FDa). The DC-link capacitor is connected in parallel to the power-supply which may be a high voltage battery.

The discharge circuit further comprises a second sub-circuit connected in parallel to the DC-Link capacitor and comprises a series-connection of a second switching element SE (Q_FDb) and a second discharge resistor (R_FDb), The first SE (Q_FDa) conducts an electrical power greater than the electrical power conducted by the second SE (Q_FDb) during the discharging of the DC-link capacitor within the predetermined duration. The first discharge resistor (R_FDa) of the first sub-circuit exhibits a resistance greater than second discharge resistor (R_FDb) of the second sub-circuit. Further, the first SE (Q_FDa) of the first sub-circuit is a smaller scale device than the second SE (Q_FDb) of the second sub-circuit, in an example, at-least one of the first SE (Q_FDa) and second SE (Q_FDb) is an IGBT.

The discharge circuit further comprises a control-device configured to generate a "Gate-signal" to control the plurality of SEs within the sub-circuits by scheduling switching of the plurality of SEs. Such scheduling comprises switching ON the second SE (Q_FDb) after switching ON the first. SE (Q_FDa) for enabling a discharging of the DC link capacitor within a predetermined duration. The control-device comprises a gate-driver configured to output a control signal (i.e. "Gate-signal") for all branches within the discharge circuit. The circuit connected to the gate driver comprises a first branch and a second branch connected to the first SE and the second SE respectively.

A first resistor (Ra1) is disposed on the first branch, and a second resistor (Rb1) is disposed on the second branch, connected in series with the first resistor (Ra1). A gate of the first SE (Q_FDa) is connected to a connection point within the first branch between the first resistor (Ra1) and the gate driver, and a gate of the second SE (Q_FDb) is connected to a connection point within the second branch between the first resistor (Ra1) and the second resistor (Rb1). Each of the branches comprises two semiconductor switching elements (PNP and NPN) defining a logic circuit to switch ON/OFF the first SE (Q_FDa) and second SE(Q_FDb). The two semiconductor switching elements (Qa1, Qa2) are defined by NPN and PNP transistors to switch ON/OFF the first SE (Q_FDa) by connecting and disconnecting a high-voltage power supply to the first SE (Q_FDa). Specifically, the transistors Qa1 and Qa2 are used to stabilize the gate voltage of the IGBT Q_FDa. Likewise, the transistors Qb1 and Qb2 are used to stabilize the gate voltage of the IGBT Q_FDb.

In an implementation, the discharge circuit further comprises a third sub-circuit connected in parallel to the DC-link capacitor and comprises a series connection of a third switching element SE (Q_FDc) and a third discharge-resistor (R_FDc). A circuit connected to the gate driver for serving the present third sub-circuit comprises a third-branch connected to the third SE (Q_FDc) and accordingly a third resistor (Rc1) disposed on the third branch. The third resistor (Rc1) disposed on the third branch is connected in series with the second resistor (Rb1) of the second branch. A gate of the third SE (Q_FDc) is connected to a connection point within the third branch between the second resistor (Rb1) and the third resistor (Rc1). The third SE (Q_FDc) conducts an electrical-power lesser than the electrical power conducted by the second SE (Q_FDb) during the discharging of the DC-link capacitor within the predetermined duration. The third discharge resistor (R_FDc) exhibits a resistance lesser than the second discharge resistor (R_FDb), and the third SE (Q_FDc) corresponds to a large scale device analogous to the second SE(Q_FDb). Further, the transistors Qc1 and Qc2 are used to stabilize the gate voltage of the IGBT Q_FDc.

Overall, a logical-operation of the logic-elements present (NPN, PNP) within the three branches and all the IGBTs (First SE, Second SE, Third SE) may be summarized through the following truth table represented by Table 1:

TABLE 1

| Qa1 (NPN) | Qa2 (PNP) | Q_FDa or First SE |
|---|---|---|
| 1 | 1 | 1 |
| 0 | 0 | 0 |
| Qb1 (NPN) | Qb2 (PNP) | Q_FDb or Second SE |
| 1 | 1 | 1 |
| 0 | 0 | 0 |
| Qa1 (NPN) | Qa2 (PNP) | Q_FDc or Third SE |
| 1 | 1 | 1 |
| 0 | 0 | 0 |

In an implementation, the discharge circuit of FIG. 2 may be incorporated for example in an electric motor drive. The electric motor drive comprises a DC-link capacitor connected in parallel to a DC power supply. An inverter converts DC power from the DC capacitor to multi-phase AC power, to drive an electric motor. An overvoltage protection unit is defined by the present discharge-circuit of FIG. 2 and is connected in parallel to the DC-link capacitor.

Figure 3A:
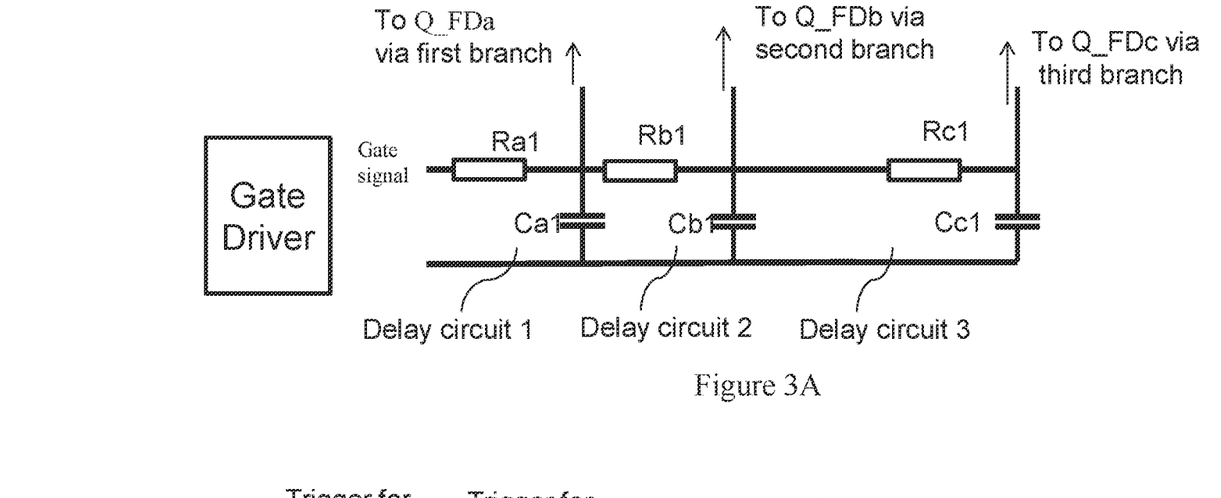
FIG. 3A illustrates a gate-driver arrangement employed within the electronic-system of FIG. 2, in accordance with an embodiment of the present subject matter.
Figure 3B:
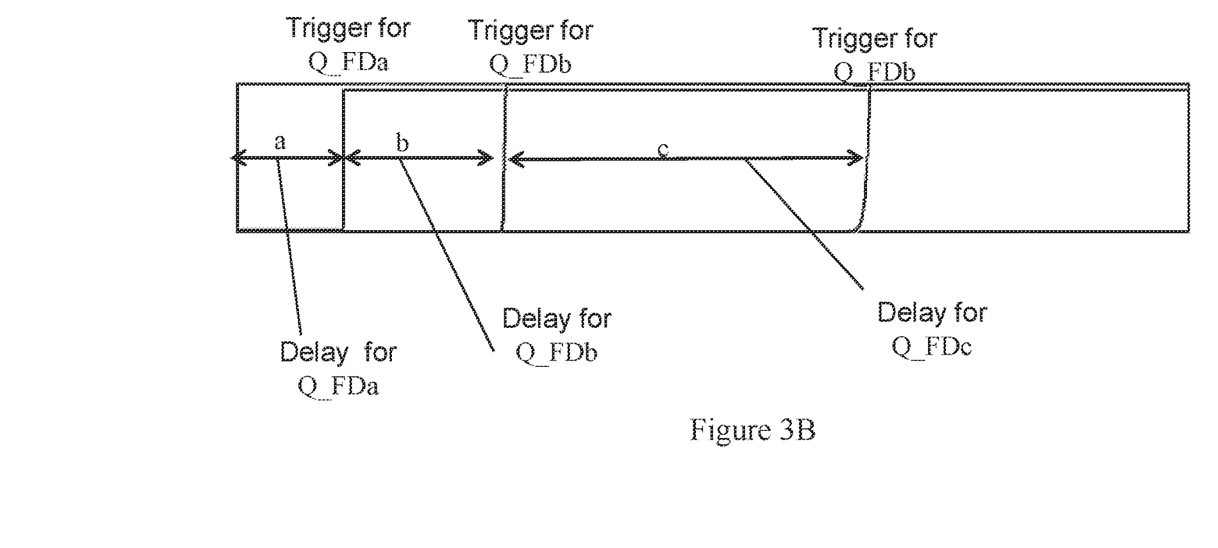
FIG. 3B illustrates a gate-driver arrangement employed within the electronic-system of FIG. 2, in accordance with an embodiment of the present subject matter.

FIG. 3A and FIG. 3B illustrate a gate-driver arrangement of FIG. 2, in accordance with an embodiment of the present subject matter. More specifically, while FIG. 3A represents the delay circuit with respect to all the branches, FIG. 3B represents the timing of the triggering of the gates of all three IGBTs (Q_FDa, Q_FDb, Q_FDc).

The present discharge circuit sets the discharge duration to a target range as may be specified by a third party or defined by a user (i.e. human operator)) of the power distribution unit. Accordingly, all IGBTs (Q_FDa, Q_FDb, Q_FDc) are triggered or fired at different-instants of time, since the duration until completing discharge is set to a certain range. Accordingly, as represented in FIG. 3A, a common driving-signal or a single gate signal may be rendered for three delay circuits (Delay circuit 1, 2, 3) for sequentially triggering the three IGBTs (Q_FDa, Q_FDb, Q_FDc) through the first, second and third branches, respectively. In other example, in case of more than 3 branches and IGBTs, a corresponding number of delay circuits may be employed. The present implementation merely represents a design example and may be construed to cover two, three or more branches associated with a plurality of delay circuits.

FIG. 3A illustrates a serial connection of the delay circuits-1, 2, 3 for the plurality of IGBTs with just one driving signal. In an example, the delay circuit may be an RC delay circuit of state of the art. However, the present example may be construed to cover other example delay circuits. For example, an adjustable impedance-element may be provided in the driver circuit for scheduling turning ON/OFF of the IGBTs at different points of time.

FIG. 3B illustrates the sequential triggering of gates of the IGBTs (Q_FDa, Q_FDb, Q_FDc) after respective time-delays 'a', 'b' and 'c' subsequent to the provision of the common gate-driver signal.

In operation, the gate signal rendered by the microcontroller or gate driver undergoes a delay by the "RC delay circuit 1". The same triggers the transistor Qa1 and Qa2 (of the first branch) to be switched substantially simultaneously, thereby in turn switching ON the corresponding IGBT Q_FDa. Neglecting a substantially small propagation delay of the transistor Qa1 and Qa2, all of the switches Qa1, Qa2 and Q_FDa may be switched after a "delay a" at substantially the same-time. The delay or the timing of the gate trigger may be adjusted by the underlying RC circuit, i.e. Ra1, Ca1.

Likewise, the switches Qb1, Qb2 and Q_FDb may be switched after a "delay b" at substantially the same-time. The delay or the timing of the gate trigger may be adjusted by the underlying RC circuit, i.e. Rb1, Cb1. The switches Qc1, Qc2 and Q_FDc, may be switched after a "delay c" at substantially the same-time. The delay or the timing of the gate trigger may be adjusted by the underlying RC circuit, i.e. Rc1, Cc1.

Figure 4:
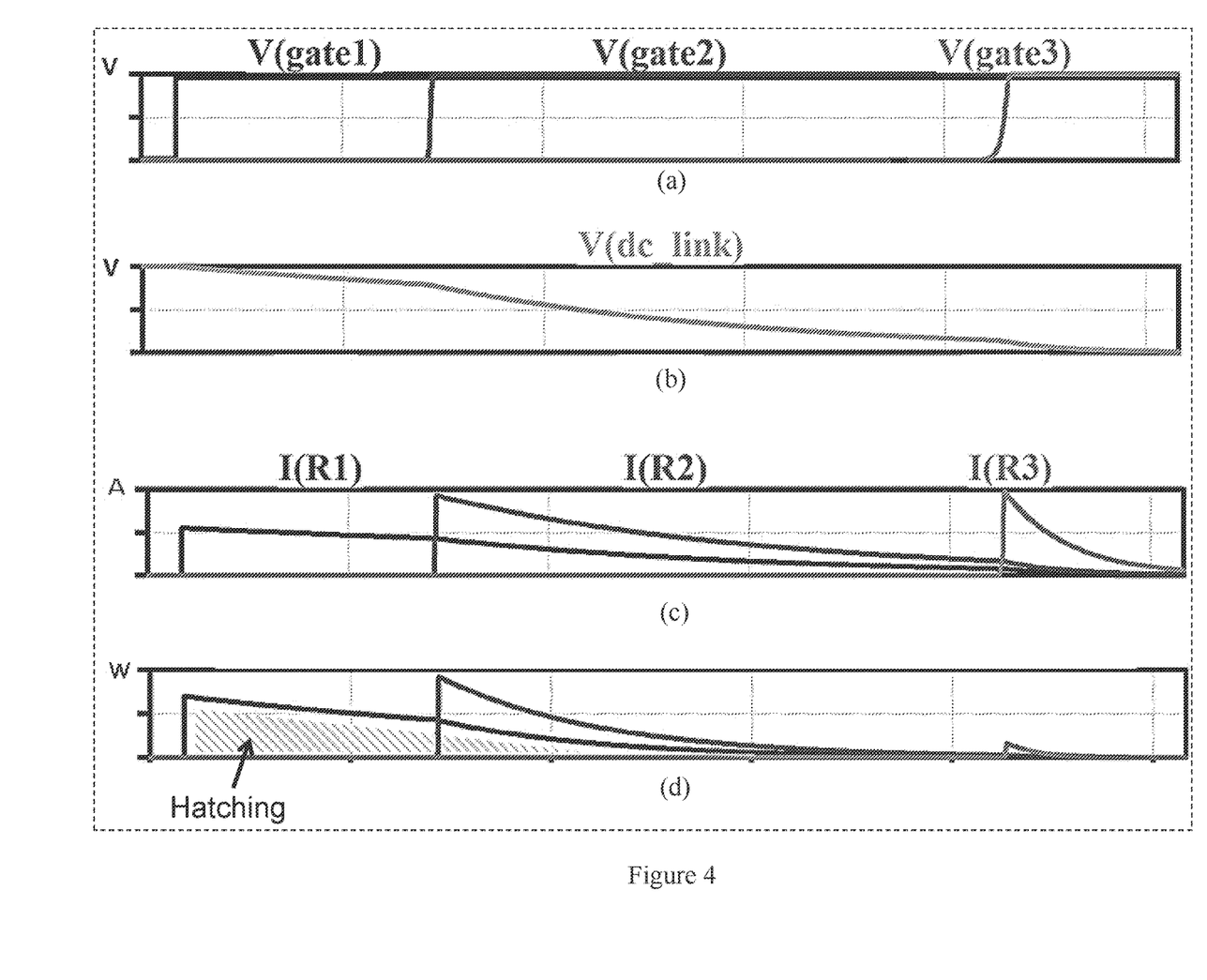
FIG. 4 illustrates a discharge pattern with respect to the discharge-circuit with plurality of branches, in accordance with an embodiment of the present subject matter.

FIG. 4 illustrates a discharge pattern with respect to the discharge-circuit with plurality of branches, in accordance with an embodiment of the present subject matter.

FIG. 4(a) correspond to FIG. 3B, such that V(gate1), V(gate2), and V(gate3) correspond to gate voltages of Q_FDa, Q_FDc, respectively. FIG. 4(b) corresponds to variation of the discharge voltage of the DC link capacitor during discharge of the DC link capacitor. FIG. 4(c) illustrates the resulting current flow (due to the discharge of the DC link capacitor) through the discharge resistors R_FDa, R_FDc, represented as Rh R2 and R3, respectively. Accordingly, the discharge current flow through R_FDa, R_FDb, R_FDc may be represented as I(R1), I(R2) and I(R3), respectively. Owing to high peak currents I(R2) and I(R3), the second SE Q_FDb and third SE Q_FDc may be sized higher than the first SE Q_FDc.

FIG. 4(d) represents the propagation of electrical power across the three branches, each branch corresponding to a series combination of discharge resistor R_FD and a corresponding switching element. IGBT 'Q_FD'. More specifically, an area with 'hatching' represents electrical power passed through the first branch comprising the Q_FDa and R_FDa. As may be observed, the first SE or Q_FDa conducts an electrical power greater than the electrical power conducted by the second and third branches represented by the second SE Q_FDb and third SE Q_FDc, respectively, during the discharging of the DC-link capacitor.

Figure 5:
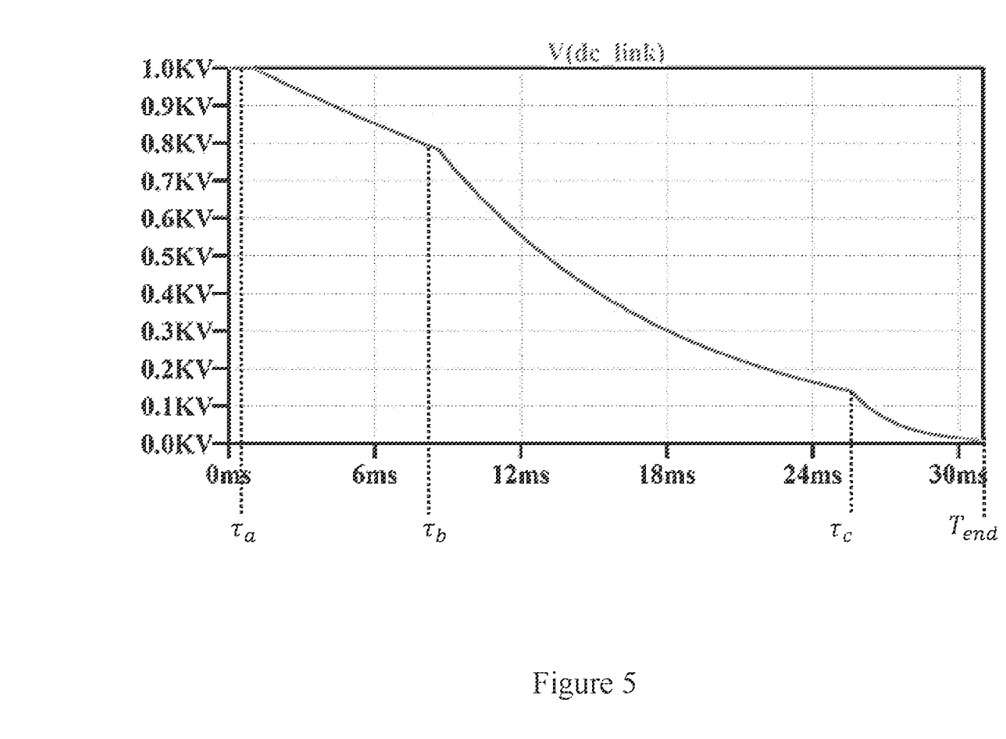
FIG. 5 illustrates an example testing of operation of the discharge circuit, in accordance with an embodiment of present subject matter.

FIG. 5 illustrates an example testing of operation of the discharge circuit, in accordance with an embodiment of present subject matter. More specifically, the present figure illustrates experimental data based on experimental resistance values of R_FDa, R_FDb, R_FDc and a target discharge duration of 30 ms. Such example values for R_FDa, R_FDb, R_FDc may be represented as follows through following Table 2:

TABLE 2

|  | R_Fda | R_FDb | R_FDc |
|---|---|---|---|
| Resistance [Ohm] | 13 | 6 | 1 |

The waveform represented in FIG. 5 corresponds to FIG. 4(b) and illustrates an example variation of the discharge voltage (V_DC link) during the discharge of the DC-link capacitor within the example target duration of 30 ms. The time milestones $\tau_a$, $\tau_b$ and $\tau_c$ within the x axis corresponds to the gate circuit delay a, delay b and delay c as depicted in FIG. 4 and accordingly represent the tinting of triggering of Q_FDa, Q_FDb, Q_FDc, respectively. As may be observed from FIG. 5, while $\tau_a$, is nearly equal to 0 ms, however $\tau_b > \tau_c > 0$ Ms. Further, $\tau_{end}$ represents the time milestone of the completion of discharge and accordingly represents the end of the 30 ms discharge duration The discharge current flow $I_{DC\ Link}$ during the entire discharge duration may be time-segmented into three time-segments based on the time milestones $\tau_a$, $\tau_b$, $\tau_c$ and $\tau_{end}$. Further, the values of various segments of $I_{DC\ Link}$ may be derived through standard RC Discharging Circuit equations. The time-segmented discharge current flow $I_{DC\ Link}$ may be represented as follows through following Table 3:

TABLE 3

| Time segment | Applicable RC time constant | $I_{dc(t)}$ |
|---|---|---|
| $[\tau_a, \tau_b)$ | $R_{FDa} * C$ | $\dfrac{U_{dc(t)}}{R_{FDa}} e^{\frac{-t}{R_{FDa}C}}$ |
| $[\tau_a, \tau_c)$ | $R_{FDa}\|\|R_{FDb} * C$ | $\dfrac{U_{dc(t)}}{R_{FDa}\|\|R_{FDb}} e^{\frac{-t}{R_{FDa}\|\|R_{FDb}C}}$ |
| $[\tau_a, T_{end}]$ | $R_{FDa}\|\|R_{FDb}\|\|R_{FDc} * C$ | $\dfrac{U_{dc(t)}}{R_{FDa}\|\|R_{FDb}\|\|R_{FDc}} e^{\frac{-t}{R_{FDa}\|\|R_{FDb}\|\|R_{FDc}C}}$ |

Further, the RMS current and energy expended in terms of discharge resistors may be represented as follows through following Table 4:

TABLE 4

|  | R_FDa | R_FDb | R_FDc |
|---|---|---|---|
| RMS Power [kW] | 17 | 14 | 1.1 |
| Energy [J] | 690 | 450 | 19 |

Figure 6:
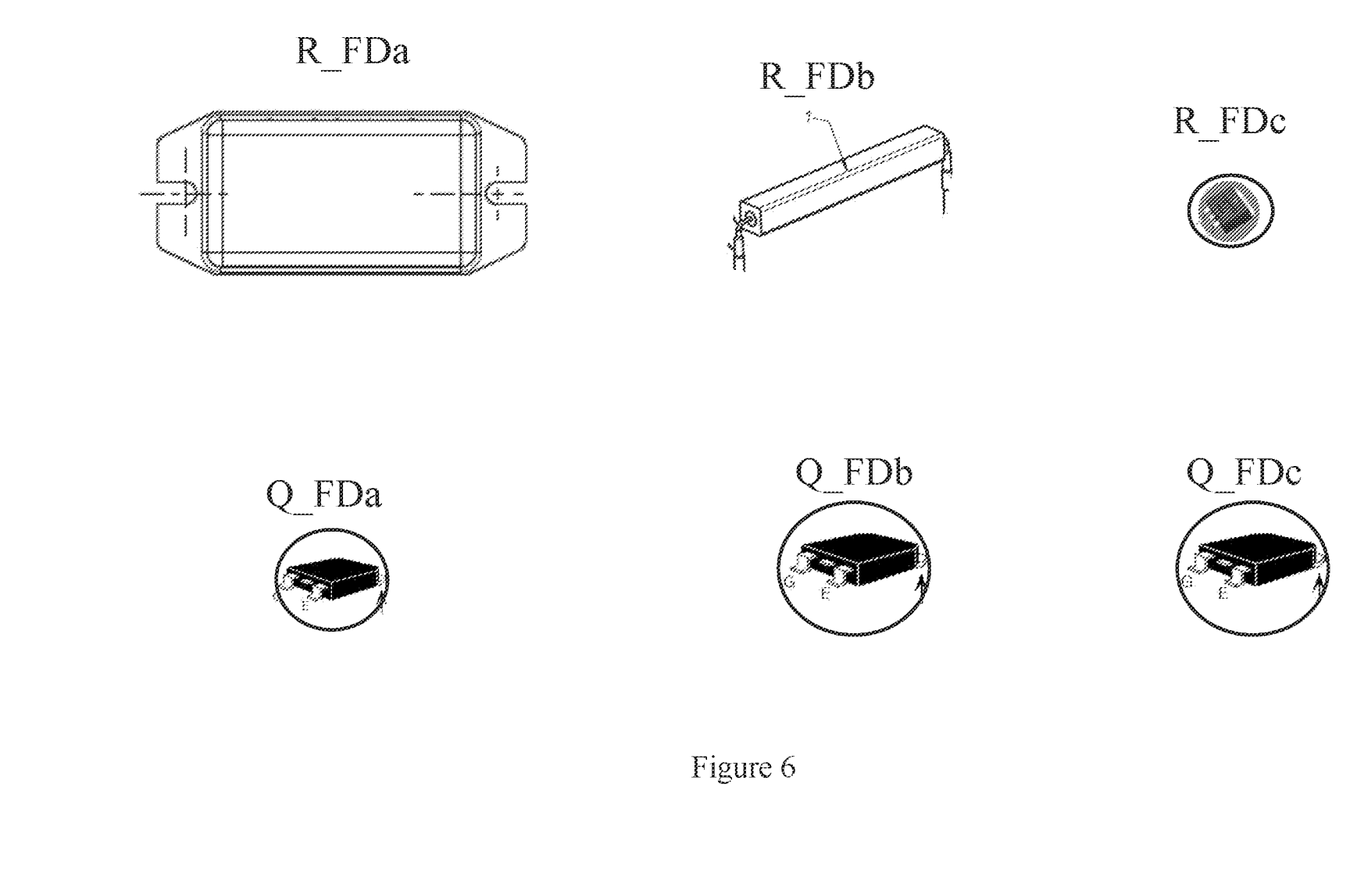
FIG. 6 illustrates an example size variation of the components across the discharge circuit, in accordance with embodiment of the present subject matter.

Accordingly, with respect to the discharge resistors R_FDa, R_FDb, R_FDc, it may be inferred from the aforesaid data that:
RMS Current of R_FDa, R_FDb, R_FDc I_FDb, R_FDc I_F_Da>I_FDb>I_FDc
Energy of Resistors E_F_Da>E_FDb>E_FDc FIG. 6 illustrates an example-size variation of the components across the discharge circuit, in accordance with embodiment of the present subject matter.

As may be observed from the figure, the first discharge resistor (R_FDa) of the first sub-circuit exhibits a resistance greater than second discharge resistor (R_FDb) of the second sub-circuit. The third discharge resistor (R_FDc) of the third sub-circuit exhibits a resistance lesser than second discharge resistor (R_FDb) of the second sub-circuit. Accordingly, the third discharge resistor (R_FDc) exhibits least resistance, while the first discharge resistor R_FDa exhibits the highest.

Further, the first SE (Q_FDa) of the first sub-circuit is a smaller scale device than the second SE (Q_FDb) of the second sub-circuit. The third SE (Q_FDc) corresponds to a large scale device than the first SE (Q_FDa) and may be analogous to the second SE. In other example, the third SE (Q_FDc) may be evenlarger scale device than the second SE (Q_FDb)

The following table 5 represents example size-values with respect to the discharge resistors and the IGBTs

TABLE 5

| R_FDa | R_FDb | R_FDc |
|---|---|---|
| 30937.5 mm³ | 6885 mm³ | 469.3 mm³ |
| Q_FDa or First SE | Q_FDb or second SE | Q_FDc or third SE |
| 469.3 mm³ | 1071.7 mm³ | 1071.7 mm³ |

Figure 7:
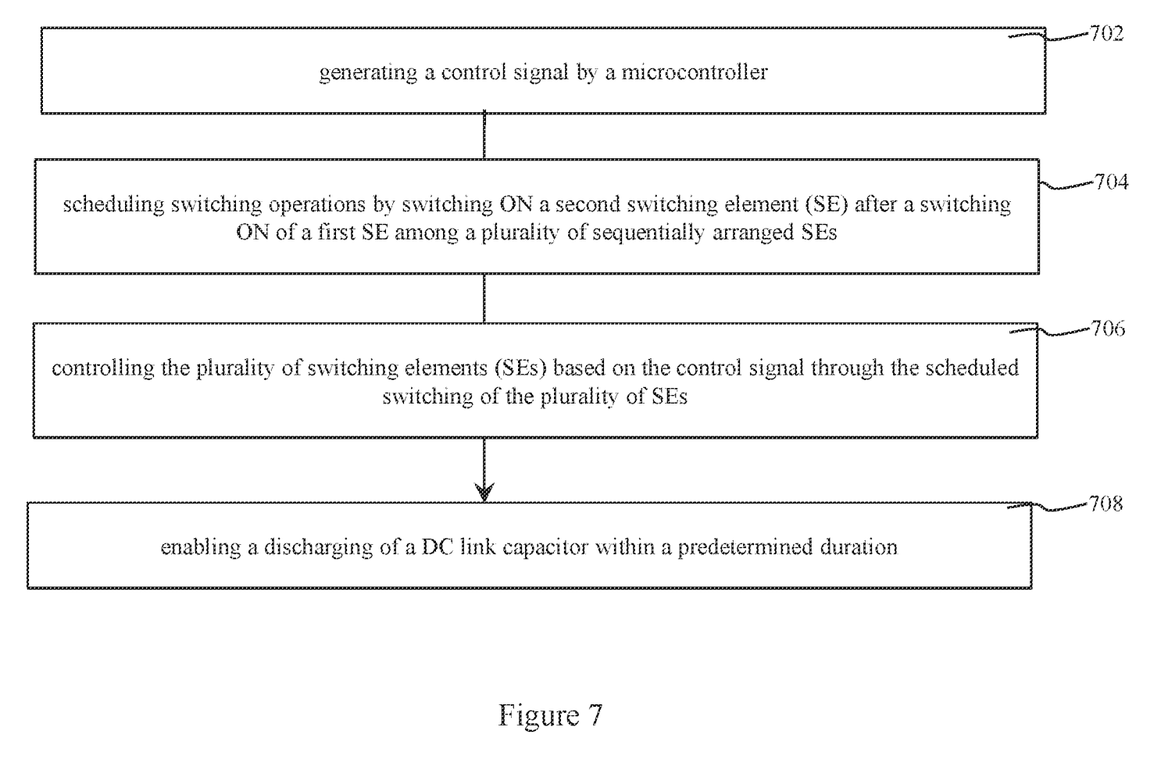
FIG. 7 illustrates method-steps in accordance with an embodiment of the present subject matter.

FIG. 7 illustrates method steps in accordance with an embodiment of the present subject matter. More specifically, the present FIG. 7 illustrates a method of operation in a discharge circuit for a smoothing capacitor or the DC link capacitor in a power-distribution unit Step 702 represents generating a control signal by a microcontroller or a gate-driver circuit.

Step 704 represents scheduling switching operations by switching ON a second switching element (SE) after a switching ON of the first SE among a plurality of sequentially arranged SEs based on said control signal, wherein the plurality of SEs are sequentially arranged through providing a first sub-circuit connected in parallel to a DC-Link capacitor and a second sub-circuit connected in parallel to the DC-Link capacitor. The DC-link capacitor is connected in parallel to a power supply. In an implementation, the switching facilitates a sequential communication of the control signal from the microcontroller to a plurality of branches of a driver-circuit to enable said scheduling the switching of the plurality of SEs. The switching comprises switching ON/OFF the first SE and second SE by connecting and disconnecting a high voltage power supply to the first SE and second SE, respectively.

In an implementation, the switching comprises receiving the control signal from the microcontroller via a first RC circuit and communicating the control signal with a first delay to a first driver-circuit branch for communication to the first SE. Further, the switching comprises receiving the control signal through a series connection of a second R-C circuit and the first R-C circuit and communicating the control signal with a second delay to a second-driver-circuit branch for communication to the second SE.

Step 706 represents controlling the plurality of switching elements (SEs) based on the control-signal through the scheduled switching of the plurality of SEs for enabling a discharging of a DC link capacitor within a predetermined target duration. The controlling comprises enabling a higher electric power conduction through the first SE with respect to the second SE during the discharging of the DC link capacitor.

The discharge circuit and the electronic system in accordance with the present subject matter at least allows an ease of setting of discharge duration of the DC Link capacitor to a target value while resorting to a simple electronic circuit configuration. In an example, a single gate signal is enabled to sequentially drive different switching element-discharge resistor based branches, thereby obviating the need of separate gate drivers otherwise needed by conventional mechanisms in case of multiple branches forming part of the discharge circuit. Moreover, the switching elements and discharge resistors are differently sized thereby further adding to the simplification in the present scenario.

In an example, the present subject matter allows maintaining substantially unequal sized discharge resistors and switching elements across the multiple branches. Last but not the least, the present discharge circuit is scalable to employ various types of delay circuits, driver circuits and logic circuits (other than referred in the preceding description) for sequencing the triggering of different switching element across different branches and thereby achieve the discharge within the target duration.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

The invention claimed is:

1. A discharge circuit for a smoothing DC-Link capacitor within a power-distribution-unit, the discharge circuit comprising:
    a first sub-circuit connected in parallel to the DC-Link capacitor and comprising a series connection of a first switching element (SE) and a first discharge resistor, wherein the DC-link capacitor is connected in parallel to a power supply,
    a second sub-circuit connected in parallel to the DC-Link capacitor and comprising a series connection of a second switching element (SE) and a second discharge resistor, and
    a control device comprising a plurality of delay-circuits connected to the plurality of SEs, wherein the control device is configured to control the plurality of SEs within the sub-circuits by scheduling switching of the plurality of SEs, wherein said scheduling, performed by the delay-circuits, comprises switching ON of the second SE after a switching ON of the first SE for enabling a discharging of the DC link capacitor within a predetermined duration.

2. The discharge circuit as claimed in claim 1, wherein the first SE conducts an electrical power greater than the electrical power conducted by the second SE during the discharging of the DC-link capacitor within the predetermined duration.

3. The discharge circuit as claimed in claim 1, wherein the control device comprises:
    a gate driver configured to output a control signal;
    the plurality of delay-circuits connected to the gate driver comprising
        a first branch and a second branch connected to the first SE and the second SE respectively,
        a first resistor disposed on the first branch, and
        a second resistor, disposed on the second branch, connected in series with the first resistor;
    wherein
    a gate of the first SE is connected to a connection point within the first branch between the first resistor and the gate control circuit the second resistor, and
    a gate of the second SE is connected to a connection point within the second branch between the first resistor and, the connection point within the second branch connected to the opposite side of the first resister across the second resistor.

4. The discharge circuit as claimed in claim 3, wherein each of the branches comprises two semiconductor switching elements defining da logic circuit to switch ON/OFF the first SE and second SE.

5. The discharge circuit as claimed in claim 4, wherein the two semiconductor switching elements comprise one or more of NPN and PNP transistors to switch ON/OFF the first SE and second SE by connecting and disconnecting a high voltage power supply to the first SE and second SE.

6. The discharge circuit as claimed in claim 1, wherein the first discharge resistor of the first sub-circuit exhibits a resistance greater than second discharge resistor of the second sub-circuit.

7. The discharge circuit as claimed in claim 1, wherein the first SE of the first sub-circuit is a smaller scale device than the second SE of the second sub-circuit.

8. The discharge circuit as claimed in claim 1, wherein at least one of the first SE and second SE is an IGBT.

9. The discharge circuit as claimed in claim 1, further comprising:

a third sub-circuit connected in parallel to the DC-Link capacitor and comprising a series connection of a third switching element (SE) and a third discharge resistor.

10. The discharge circuit as claimed in claim 9,
wherein the circuit connected to the gate driver comprises
a third branch connected to the third SE;
a third resistor disposed on the third branch, and
wherein a gate of the third SE is connected to a connection point within the third branch between the second resistor and the third resistor.

11. The discharge circuit as claimed in claim 9, the third SE conducts an electrical power lesser than the electrical power conducted by the second SE during the discharging of the DC-link capacitor within the predetermined duration.

12. The discharge circuit as claimed in claim 9, herein the third discharge resistor of the third sub-circuit exhibits a resistance lesser than second discharge resistor of the second sub-circuit.

13. An electric motor drive comprising:
a DC-link capacitor connected in parallel to a DC power supply;
an inverter converting DC power from the DC capacitor to multi-phase AC power, to drive an electric motor; and
an overvoltage protection unit defined by a discharge circuit connected in parallel to the DC-link capacitor, said discharge circuit comprising:
a first sub-circuit connected in parallel to a DC-Link capacitor and comprising a series connection of a first switching element (SE) and a first discharge resistor, wherein the DC-link capacitor is connected in parallel to a power supply
a second sub-circuit connected in parallel to the DC-Link capacitor and comprising a series connection of a second switching element (SE) and a second discharge resistor, and
a control device comprising a plurality of delay-circuits connected to the plurality of SEs, wherein the control device is configured to control the plurality of SEs within the sub-circuits by scheduling the switching of the plurality of SEs, wherein said scheduling, performed by the delay-circuits, comprises switching ON of the second SE after a switching ON of the first SE for enabling a discharging the DC link capacitor within a predetermined duration.

* * * * *